United States Patent
Yamamura et al.

(10) Patent No.: US 12,079,002 B2
(45) Date of Patent: Sep. 3, 2024

(54) AUTONOMOUS WORK MACHINE

(71) Applicant: HONDA MOTOR CO., LTD., Tokyo (JP)

(72) Inventors: Makoto Yamamura, Wako (JP); Hiroto Takahashi, Wako (JP); Takamasa Udagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 694 days.

(21) Appl. No.: 17/233,618

(22) Filed: Apr. 19, 2021

(65) Prior Publication Data

US 2021/0235617 A1    Aug. 5, 2021

Related U.S. Application Data (63) Continuation of application No. PCT/JP2018/040526, filed on Oct. 31, 2018.

(51) Int. Cl.
*G05D 1/00* (2024.01)
*A01B 69/00* (2006.01)
(Continued)

(52) U.S. Cl.
CPC ........... *G05D 1/0246* (2013.01); *A01B 69/00* (2013.01); *A01D 34/008* (2013.01);
(Continued)

(58) Field of Classification Search
CPC ......... G05D 2201/0208; G05D 1/0246; G05D 1/0276; G05D 1/0272; G05D 1/0277; G05D 1/0219; G05D 1/0214; G05D 1/02; G05D 1/0088; G05D 1/0038; G05D 1/0016; B60L 53/36; B25J 11/00; B25J 9/1684;
(Continued)

(56) References Cited

U.S. PATENT DOCUMENTS 4,868,752 A * 9/1989 Fujii .................... G05D 1/0246
701/28
8,731,295 B2 * 5/2014 Schepelmann ...... G06V 10/809
382/164
(Continued)

FOREIGN PATENT DOCUMENTS

CA    2748079 A1 * 2/2012 ............... G06N 5/04
CN    110087449 A * 8/2019 ........... A01D 34/008
(Continued)

OTHER PUBLICATIONS

Notification Regarding Third Party Observation for European Patent Application No. 18938755.8 mailed Sep. 9, 2022.
(Continued)

*Primary Examiner* — Arpad Fabian-Kovacs
(74) *Attorney, Agent, or Firm* — Thomas | Horstemeyer, LLP (57) ABSTRACT

An autonomous work machine for automatically performing a work on a work area while moving in the work area, includes an image capturing unit configured to capture the work area; and a control unit configured to specify, based on an image of the work area captured by the image capturing unit, contents of a failure having occurred in the work area, and control the autonomous work machine based on the specified contents of the failure.

16 Claims, 11 Drawing Sheets

(51) Int. Cl.
*A01D 34/00* (2006.01)
*A01D 34/78* (2006.01)
*A01D 101/00* (2006.01)
*B25J 9/16* (2006.01)
*B25J 11/00* (2006.01)
*B60L 53/36* (2019.01)

(52) U.S. Cl.
CPC ............. *G05D 1/0038* (2013.01); *G05D 1/02* (2013.01); *G05D 1/0219* (2013.01); *G05D 1/0227* (2013.01); *A01D 34/78* (2013.01); *A01D 2101/00* (2013.01); *B25J 9/1664* (2013.01); *B25J 9/1684* (2013.01); *B25J 11/00* (2013.01); *B60L 53/36* (2019.02); *G05D 1/0016* (2013.01); *G05D 1/0088* (2013.01); *G05D 1/0214* (2013.01); *G05D 1/0276* (2013.01)

(58) Field of Classification Search
CPC ...... B25J 9/1664; A01B 69/00; A01D 34/008; A01D 34/78; A01D 2101/00
See application file for complete search history.

(56) References Cited

U.S. PATENT DOCUMENTS

| | | | | |
|---|---|---|---|---|
| 9,655,356 | B1 * | 5/2017 | Lytle, Jr. | G06F 18/22 |
| 9,848,529 | B2 | 12/2017 | Franzius et al. | |
| 10,021,830 | B2 * | 7/2018 | Doughty | A01D 34/736 |
| 10,643,377 | B2 | 5/2020 | Grufman et al. | |
| 10,725,476 | B2 | 7/2020 | Yamanaka et al. | |
| 11,464,161 | B1 * | 10/2022 | Phanco | G06V 10/454 |
| 2008/0039974 | A1 * | 2/2008 | Sandin | G05D 1/0259 901/46 |
| 2016/0302354 | A1 | 10/2016 | Franzius et al. | |
| 2017/0345210 | A1 | 11/2017 | Grufman et al. | |
| 2018/0364729 | A1 | 12/2018 | Yamanaka et al. | |
| 2019/0320580 | A1 | 10/2019 | Haneda et al. | |
| 2019/0333214 | A1 * | 10/2019 | Haneda | A01G 25/09 |
| 2020/0042009 | A1 * | 2/2020 | Yang | G05D 1/0246 |
| 2021/0185906 | A1 * | 6/2021 | Tsuruda | A01D 34/008 |
| 2021/0298229 | A1 * | 9/2021 | Takahashi | A01B 79/02 |

FOREIGN PATENT DOCUMENTS

| | | | | |
|---|---|---|---|---|
| CN | 114937258 | A * | 8/2022 | ............ A01D 34/008 |
| DE | 102013203705 | A1 * | 9/2014 | ............ A01D 34/008 |
| EP | 1704766 | A1 * | 9/2006 | ............ A01B 69/001 |
| EP | 3081068 | A1 | 10/2016 | |
| JP | H2-113906 | U | 9/1990 | |
| JP | 2016-202165 | A | 12/2016 | |
| JP | 2017-158532 | A | 9/2017 | |
| JP | 2018-14963 | A | 2/2018 | |
| JP | 2018-108040 | A | 7/2018 | |
| WO | 2016/103067 | A1 | 6/2016 | |
| WO | 2017/158797 | A1 | 9/2017 | |
| WO | WO-2017158796 | A1 * | 9/2017 | ............ A01D 34/001 |
| WO | 2018/123629 | A1 | 7/2018 | |
| WO | WO-2019167204 | A1 * | 9/2019 | ............ G05D 1/0044 |
| WO | WO-2019167207 | A1 * | 9/2019 | ............ A01D 34/008 |
| WO | WO-2019167209 | A1 * | 9/2019 | ............... G05D 1/02 |
| WO | 2020/090038 | A1 | 5/2020 | |

OTHER PUBLICATIONS

International Search Report and Written Opinion for PCT/JP2018/040526 mailed Dec. 18, 2018.

Extended European Search Report for European Patent Application No. 18938755.8 mailed Sep. 15, 2021.

* cited by examiner

AUTONOMOUS WORK MACHINE

CROSS-REFERENCE TO RELATED APPLICATION(S)

This application is a Continuation of International Patent Application No. PCT/JP2018/040526, filed Oct. 31, 2018, the entire disclosures of which are incorporated herein by reference.

BACKGROUND OF THE INVENTION

Field of the Invention

The present invention relates to an autonomous work machine.

Description of the Related Art

There is proposed an autonomous work machine that automatically performs a work such as a lawn mowing work on a work area. For example, Japanese Patent Laid-Open No. 2018-14963 discloses a work machine that automatically performs a lawn mowing work. The work machine disclosed in Japanese Patent Laid-Open No. 2018-14963 detects contact with a foreign object by a sensor, and performs, at the time of contact, an avoidance operation or recovery operation.

In a scheme of detecting contact with a foreign object like the work machine disclosed in Japanese Patent Laid-Open No. 2018-14963, it is difficult to cope with a trouble that does not include contact but influences the operation of the work machine, such as a hole dug in a work area by an animal. In addition, since a foreign object cannot be detected unless the work machine contacts it, coping with the trouble may be delayed.

SUMMARY OF THE INVENTION

It is an object of the present invention to provide an autonomous work machine that can cope with various events having occurred in a work area.

According to an aspect of the present invention, there is provided an autonomous work machine for automatically performing a work on a work area while moving in the work area, comprising:
  an image capturing unit configured to capture the work area; and
  a control unit configured to specify, based on an image of the work area captured by the image capturing unit, contents of a failure having occurred in the work area, and control the autonomous work machine based on the specified contents of the failure.

Further features of the present invention will become apparent from the following description of exemplary embodiments (with reference to the attached drawings).

DESCRIPTION OF THE EMBODIMENTS

<Overview of Autonomous Work Machine>

Figure 1:
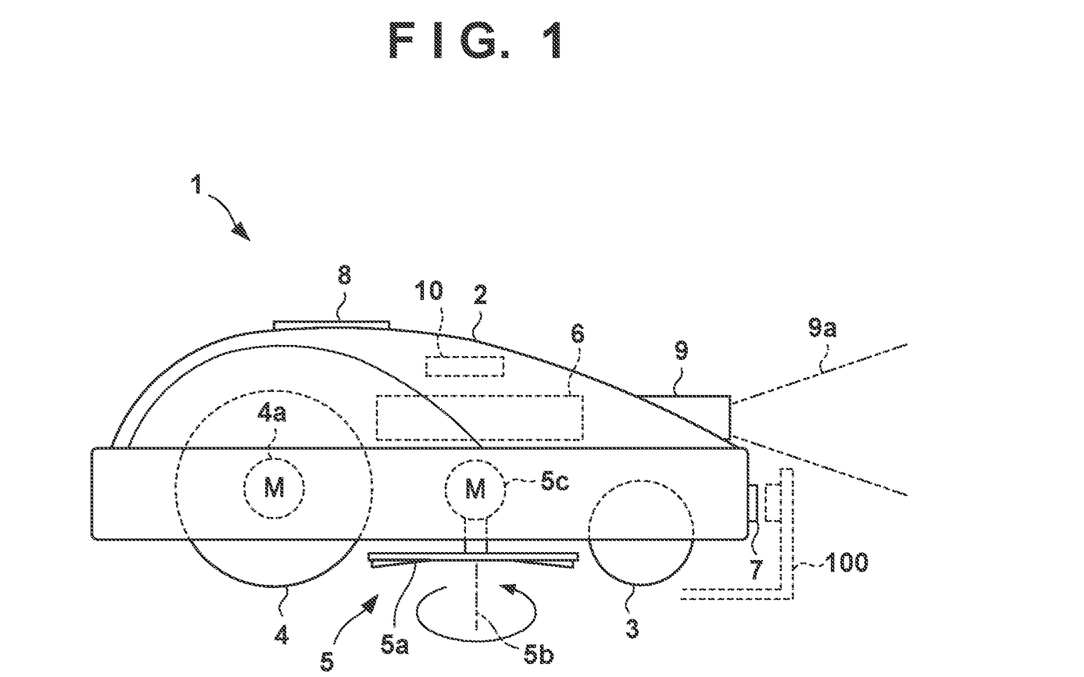
FIG. 1 is a side view of an autonomous work machine according to an embodiment of the present invention.

FIG. 1 is a side view of an autonomous work machine 1 according to an embodiment of the present invention. The work machine 1 of this embodiment is a lawn mower that performs a lawn mowing work while moving in a work area (lawn area). However, the present invention is also applicable to other types of work machines such as a snowplow, a cultivator, and a road paving machine.

The work machine 1 is a four-wheeled vehicle in which left and right front wheels 3 and left and right rear wheels 4 are supported by a vehicle body 2. The left and right rear wheels 4 are driving wheels and move the work machine 1 in the work area. Each rear wheel 4 is provided with a driving mechanism that uses a motor 4a as a driving source, and the left and right rear wheels 4 undergo rotation control independently. By performing rotation control for the left and right rear wheels 4 independently, the direction of travel of the work machine 1 can be controlled. The left and right front wheels 3 are provided to be freely rotatable.

The work machine 1 includes a work unit 5. The work unit 5 is a mechanism for performing a lawn mowing work on a work area. The work unit 5 includes a rotary cutter 5a and a driving mechanism for rotating the rotary cutter 5a around an axis 5b in an almost vertical direction using a motor 5c as a driving source. The rotary cutter 5a is arranged below the vehicle body 2 in the central portion (between the front wheels 3 and the rear wheels 4) in the front-and-rear direction of the work machine 1. The rotary cutter 5a according to this embodiment is provided with blades so that a lawn can be cut regardless of whether the rotation direction is a forward direction or a backward direction. The work unit 5 may include a lifting mechanism for changing the position of the rotary cutter 5a in the vertical direction. With the above arrangement, while moving the work machine 1 by the front wheels 3 and the rear wheels 4, the work unit 5 can perform a lawn mowing work.

An image capturing device 9 is provided in the front portion of the vehicle body 2. The image capturing device 9 is a camera including an image sensor such as a CCD sensor or CMOS sensor, and an optical system such as a lens. In this embodiment, an image capturing range 9a of the image capturing device 9 is set on the front side of the work machine 1. However, the image capturing range 9a is not limited to this, and a 360-degree camera may be adopted as the image capturing device 9.

An operation panel 8 that accepts an operation input from a user is provided in the top portion of the vehicle body 2. A display unit may be provided in the operation panel 8, and a touch panel display may be adopted as the operation panel 8. The user can input various kinds of information of the work machine 1 from the operation panel 8.

The work machine 1 includes a battery 6 as a power supply. The battery 6 supplies power to electric loads provided in the work machine 1, such as the motors 4a and 5c and the image capturing device 9. The battery 6 can be charged in a charging station 100, and a connector 7 is provided in the vehicle body 2 to electrically connect the charging station 100 and the work machine 1.

Figure 2:
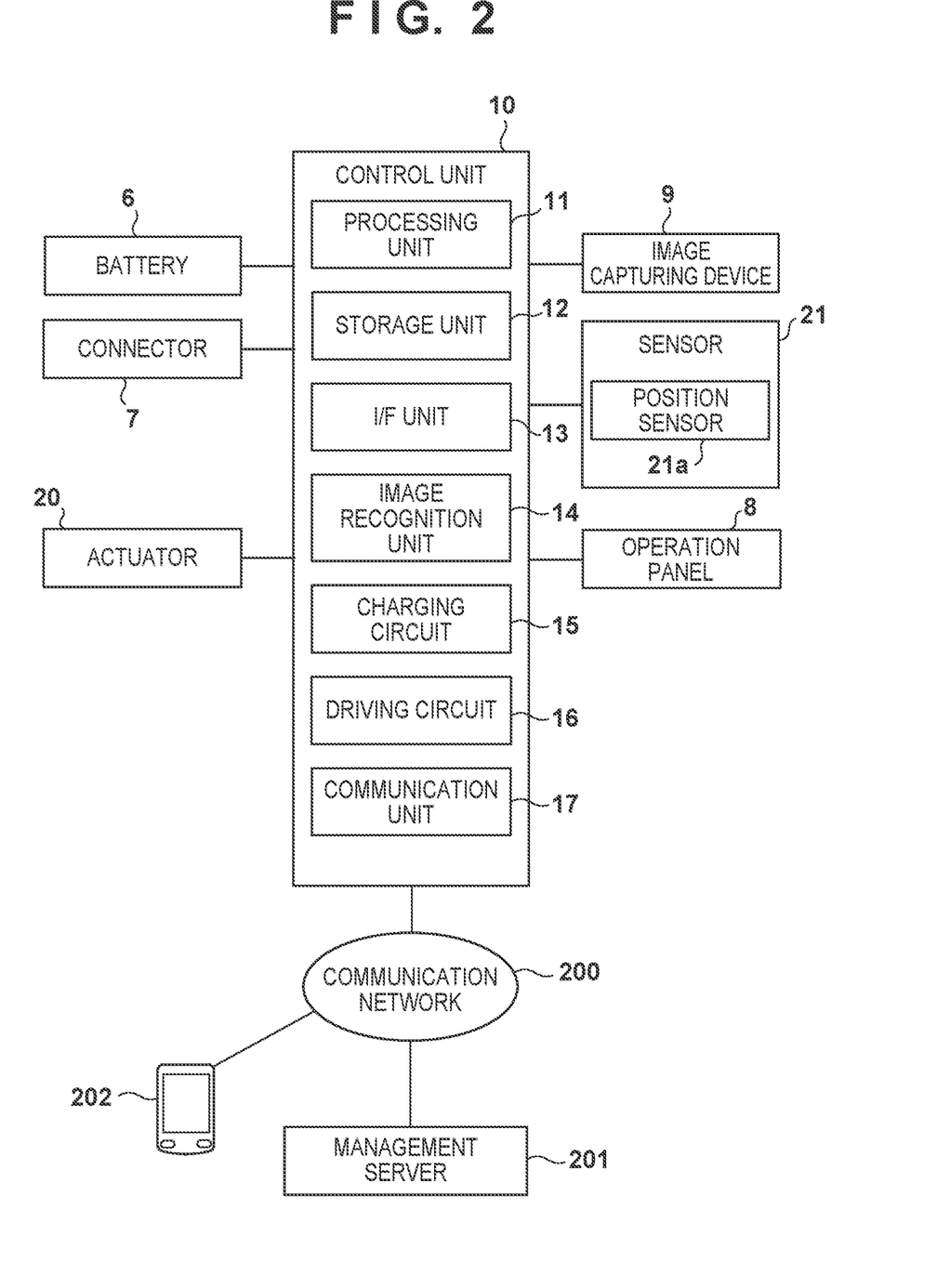
FIG. 2 is a block diagram showing a control unit of the autonomous work machine shown in FIG. 1.

The work machine 1 includes a control unit 10 that controls the operation of the work machine 1. FIG. 2 is a block diagram showing the control unit 10 and its peripheral arrangement.

The control unit 10 includes a processing unit 11, a storage unit 12 such as a RAM or ROM, and an interface unit (I/F unit) 13 that relays transmission/reception of signals between an external device and the processing unit 11. The processing unit 11 is a processor represented by a CPU, and controls an actuator 20 and the image capturing device 9 based on a detection result of a sensor 21, an input to the operation panel 8, and the like by executing a program stored in the storage unit 12. The actuator includes the motors 4a and 5c, and the processing unit 11 controls driving of these motors via a driving circuit 16.

The sensor 21 includes a position sensor 21a. The position sensor 21a is a sensor for specifying the current position of the work machine 1 and, for example, one or both of a GPS sensor and a sensor that detects the rotation amounts of the left and right rear wheels 4 can be used. The sensor that detects the rotation amounts of the left and right rear wheels 4 is, for example, a rotary encoder, and may be a sensor that directly detects the rotation amounts of the driving shafts of the rear wheels 4 or a sensor that detects the rotation amount of the output shaft of the motor 4a.

Alternatively, the current position of the work machine 1 may be specified from a captured image obtained by capturing, by the image capturing device 9, a marker arranged in the work area or specified from information acquired by wireless communication from a beacon arranged in the work area.

The control unit 10 includes an image recognition unit 14 that recognizes contents of an image captured by the image capturing device 9. The image recognition unit 14 is, for example, an image processing processor, and specifies a type of an object included in the captured image by analyzing the captured image. The image recognition unit 14 may function as artificial intelligence machine-learned by focusing on image recognition. The processing unit 11 controls the operation of the work machine 1 based on the recognition result of the image recognition unit 14.

Note that an arrangement in which the processing unit 11 functions as the image recognition unit 14 can be adopted. However, by providing the image recognition unit 14 separately from the processing unit 11 as in this embodiment, it is possible to reduce the processing load of the processing unit 11.

The control unit 10 includes a charging circuit 15 that charges the battery 6. The charging circuit 15 can charge the battery 6 by power supplied from the charging station 100 via the connector 7.

The control unit 10 further includes a communication unit 17. The communication unit 17 can wirelessly communicate with a management server 201 via a communication network 200. The management server 201 is a server that manages the state of the work machine 1, and can manage, for example, pieces of information of a plurality of work machines 1. The management server 201 can wirelessly communicate with a portable terminal 202 such as a smartphone via the communication network 200. The portable terminal 202 is, for example, the terminal of the manager of the work machine 1, and can receive the information of the work machine 1 from the management server 201. This allows the manager to monitor the work machine 1 even in a place away from the work machine 1.

<Example of Usage of Work Machine>

Figure 3:
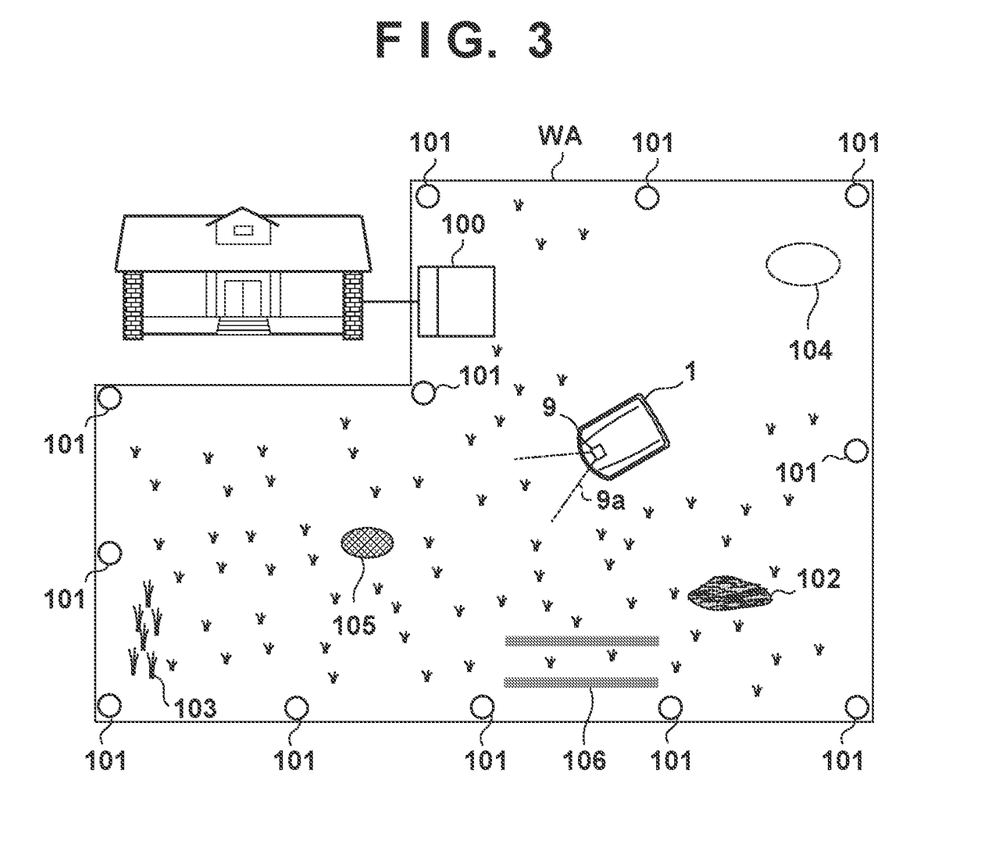
FIG. 3 is a schematic view showing an example of usage of the autonomous work machine shown in FIG. 1.

FIG. 3 is a schematic view showing an example of usage of the work machine 1. Referring to FIG. 3, the work machine 1 performs a lawn mowing work on a work area (lawn area) WA adjacent to a house. The work machine 1 of this embodiment has no function of collecting a mowed lawn, and the mowed lawn is left in the work area WA and is used as fertilizer. Note that the work machine 1 may have a function of collecting a mowed lawn, and may include, for example, a mechanism for sending the mowed lawn to a collecting bag.

In the work area WA, the charging station 100 supplied with power from the house is installed. The work machine 1 starts from the charging station 100, performs a lawn mowing work on the work area WA, and then returns to the charging station 100. In the work area WA, a plurality of markers 101 that indicate division of the work area WA are provided. Each marker 101 is, for example, a columnar member. Division of the work area WA may be performed by area wires that are laid to surround the work area WA and generate a magnetic field.

Various failures may occur in the work area WA. The failures include, for example, an object to be removed from the work area WA, an event to be recovered in the work area WA, and an object that hinders the operation of the work machine 1, and do not usually or normally exist.

FIG. 3 shows, as examples, a clump 102 of the mowed lawn, weeds 103, peeling-off 104 of the lawn, a hole 105 dug by an animal such as a rabbit or a mole, and a track 106. The clump 102 of the mowed lawn can be generated when the mowed lawn wet with rain forms a ball. This clump 102 of the mowed lawn looks bad and is desirably scattered. The peeling-off 104 of the lawn indicates a portion where the lawn peels off to expose the ground. This also looks bad, and thus it is desirable to promote the growth of the lawn. The hole 105 or the track 106 may hinder the movement of the work machine 1. In this embodiment, it is possible to recognize the existence and contents of such failure from the image captured by the image capturing device 9, and reflects them on control of the work machine 1.

<Example of Control>

An example of control of the work machine 1 by the control unit 10 will be described. Examples of contents of control executed by the control unit 10 are free control for arbitrary performing a lawn mowing work on the work area WA and schedule control for performing a lawn mowing work on the work area WA in accordance with a predetermined work schedule. The free control is control for performing a lawn mowing while making the work machine 1 travel straight, and sequentially switching the traveling direction at the boundary of the work area WA. The traveling direction may be decided randomly or decided in accordance with a predetermined rule.

Schedule control is control for performing a lawn mowing work while basically moving the work machine 1 in accordance with a predetermined route. In this control, the coordinate information and work plan information of the work area WA are stored in advance in the storage unit 12. The control unit 10 performs a lawn mowing work by moving the work machine 1 on the predetermined route while confirming the current position of the work machine 1 based on the detection result of the position sensor 21a. The work plan information includes work time information in addition to the information of the route. The work time is the time of the lawn mowing work per unit area, and can be defined by the moving speed of the work machine 1.

Figure 4:
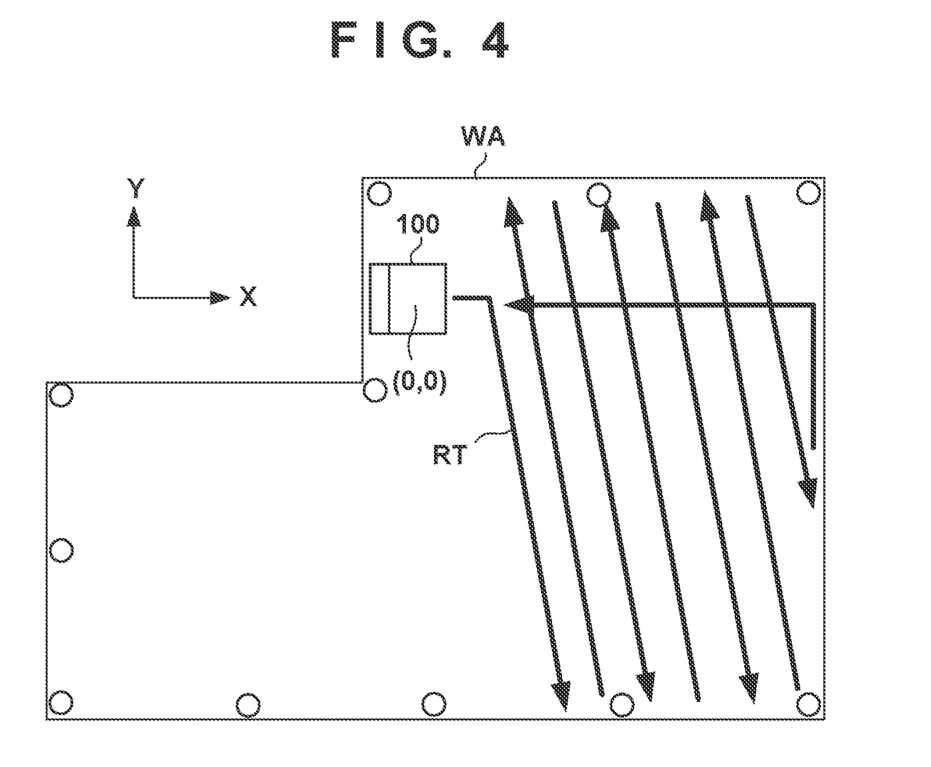
FIG. 4 is a schematic view showing an example of work information of the autonomous work machine shown in FIG. 1.

FIG. 4 schematically shows the coordinate information of the work area WA. In the example shown in FIG. 4, the two-dimensional coordinates of the work area WA are defined by the X and Y directions as horizontal directions orthogonal to each other, and the origin (0, 0) is set at the position of the charging station 100. A route RT indicates a moving route on which the work machine 1 to be moved, and the control unit 10 makes the work machine 1 perform a lawn mowing work while making the work machine 1 move on the route RT. The route RT basically makes the work machine 1 travel straight and changes the course at the boundary. The coordinate information of the work area WA and the current position information of the work machine 1 may be shared in the management server 201. This allows the management server 201 to specify the current position of the work machine 1, and it is possible to provide such information as work status information to the portable terminal 202.

Figure 5:
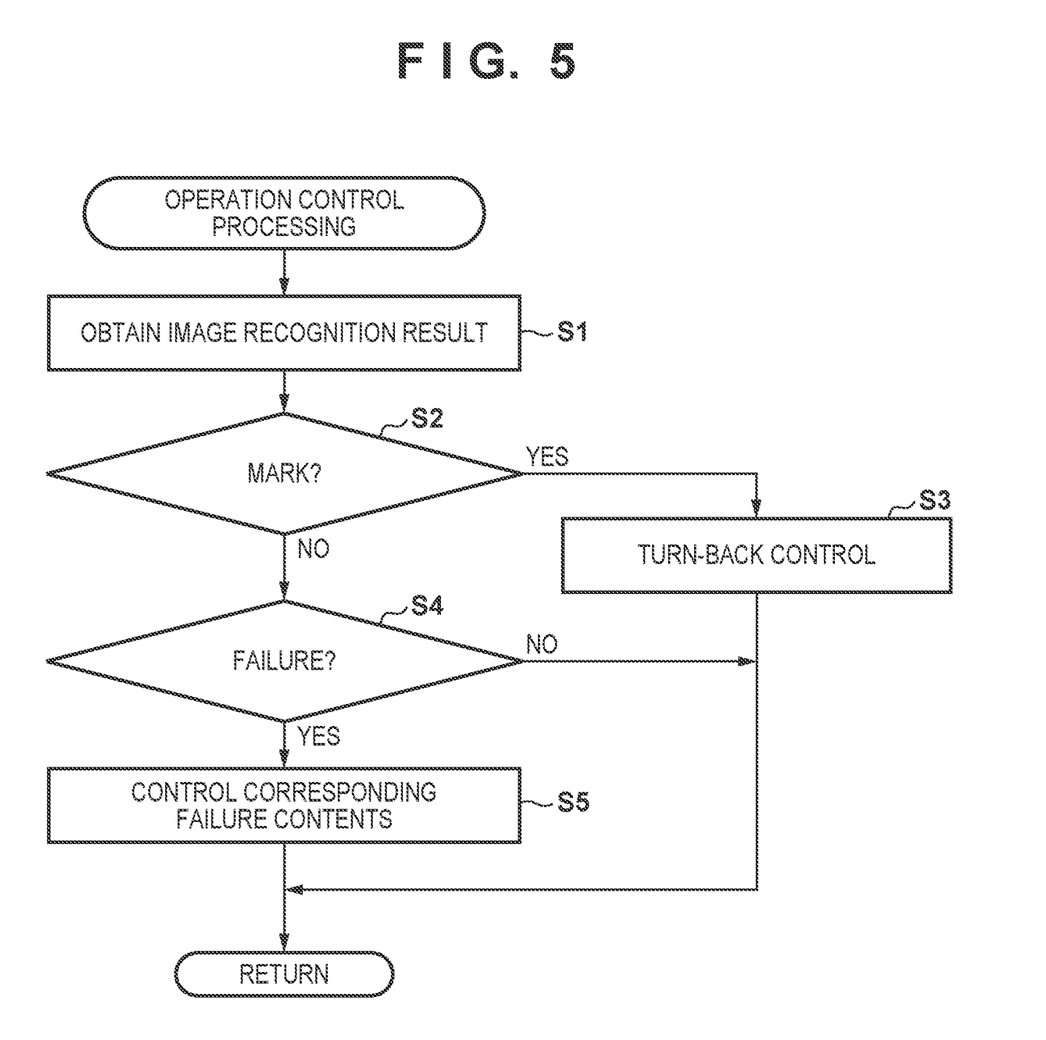
FIG. 5 is a flowchart illustrating an example of processing executed by the control unit shown in FIG. 2.

Control of the work machine 1 using a captured image of the image capturing device 9 will be described next. FIG. 5 is a flowchart illustrating an example of control executed by the processing unit 11 of the control unit 10. For example, the image capturing device 9 captures an image at a predetermined period, and the image recognition unit 14 recognizes an object in the captured image at the period.

In step S1, the recognition result of the captured image is acquired from the image recognition unit 14. In step S2, it is determined whether the recognition result acquired in step S1 indicates the marker 101. If the marker 101 is indicated, the process advances to step S3, and turn-back control is executed. The turn-back control is control for changing the course of the work machine 1 at the boundary of the work area WA so the work machine 1 does not travel outside the work area WA. A practical example will be described later. The change of the course may be arbitrarily set in the case of free control, or the course may be changed only by a predetermined angle. In schedule control, the course is changed in accordance with the route RT.

In step S4, it is determined whether the recognition result acquired is step S1 indicates a failure in the work area WA. If a failure is indicated, the process advances to step S5, and control corresponding to contents of the failure is executed. A practical example will be described later.

<Example of Control Based on Image Recognition Result>

An example of control based on the recognition result of the image recognition unit 14 will be described.

<Detection of Marker>

Figure 6:
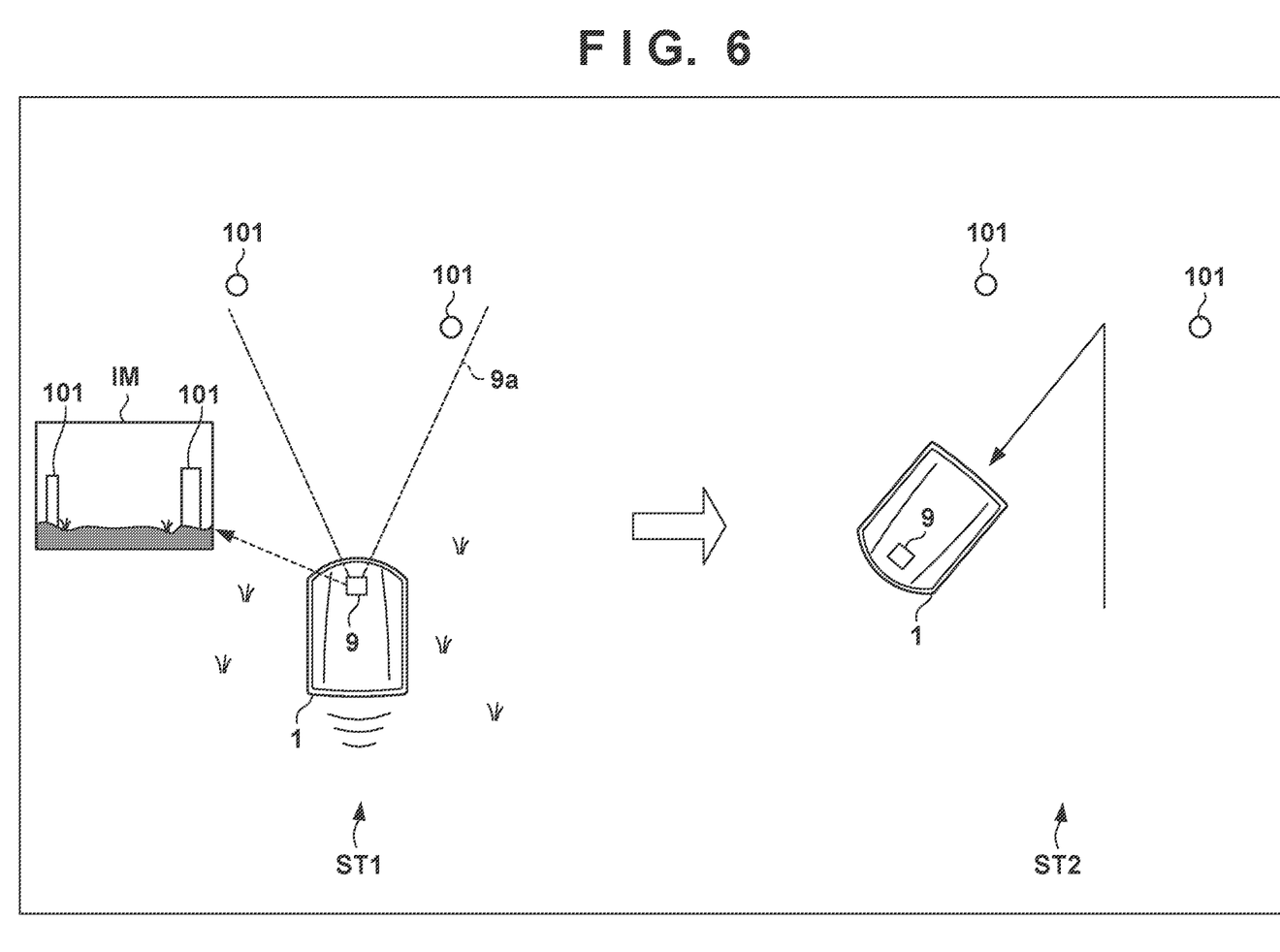
FIG. 6 is an explanatory view showing an example of control of the autonomous work machine shown in FIG. 1.

FIG. 6 shows an example of control when the existence of the markers 101 is recognized. A state ST1 indicates an example in which the markers 101 fall within the image capturing range 9a and an image of the markers 101 is included in a captured image IM. The image recognition unit 14 recognizes the existence of the markers 101 from the captured image IM.

When the image recognition unit 14 recognizes the existence of the markers 101, the processing unit 11 changes the course of the work machine 1 near the boundary of the work area WA. A state ST2 indicates an example in which the work machine 1 changes its course. The position of the boundary of the work area WA may be calculated by, for example, the image recognition unit 14 from the image of the markers 101. If this calculation operation is adopted, it is possible to more correctly estimate the positions of the markers 101 with respect to the work machine 1 by providing two image capturing devices 9 apart from each other in the vehicle width direction, and using the parallax between two captured images. The position of the boundary of the work area WA can also be estimated by the processing unit 11 from the coordinates of the markers 101 in the coordinate information of the work area WA and the recognition result of the current position based on the detection result of the position sensor 21a.

<Detection of Failure>

Figure 7:
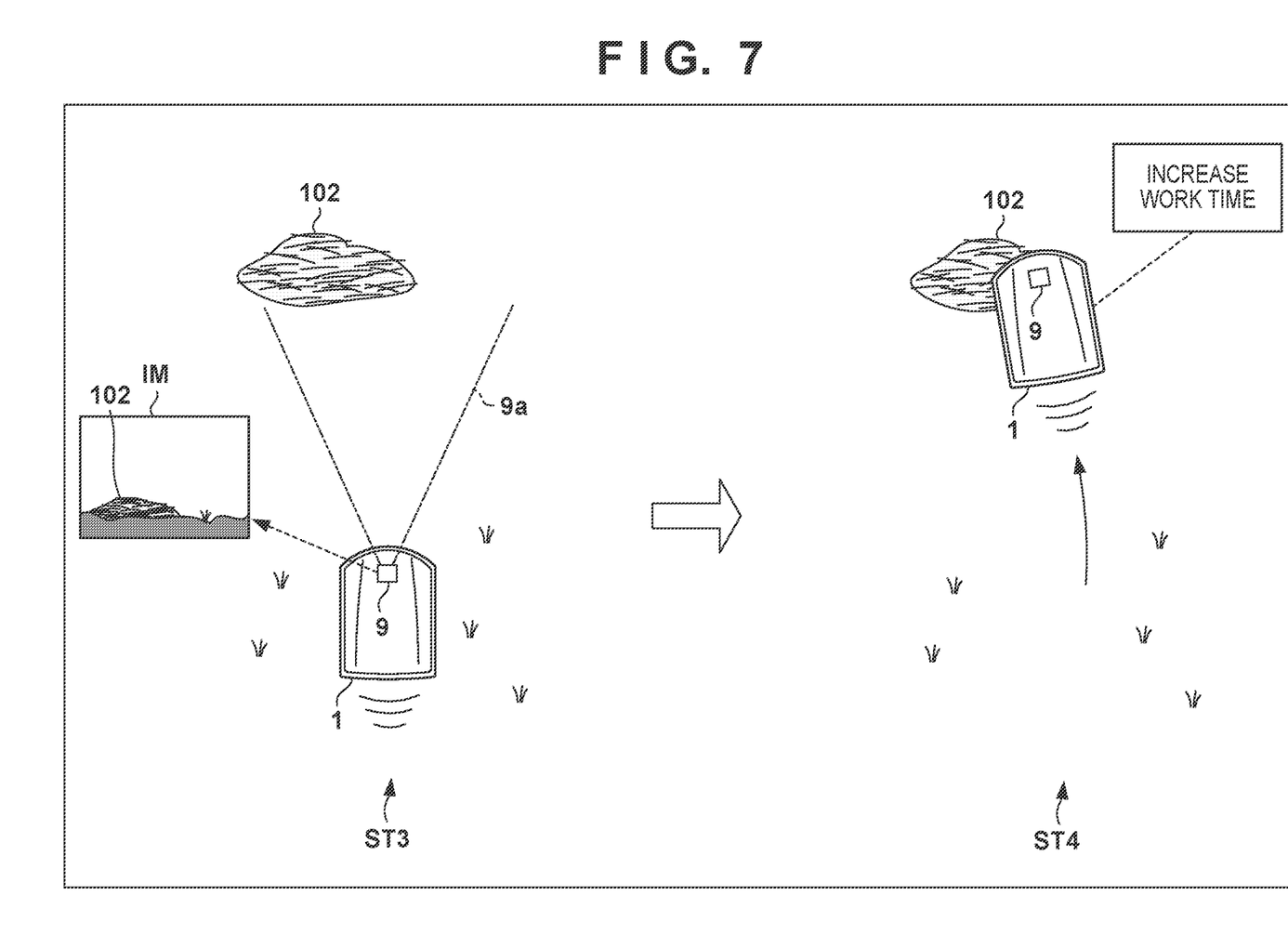
FIG. 7 is an explanatory view showing another example of control of the autonomous work machine shown in FIG. 1.

FIG. 7 shows an example of control when the existence of a failure is recognized. A state ST3 indicates a state in which the clump 102 of the mowed lawn falls within the image capturing range 9a and an image of the clump 102 of the mowed lawn is included in the captured image IM. The image recognition unit 14 recognizes the existence of the clump 102 of the mowed lawn from the captured image IM.

When the image recognition unit 14 recognizes the existence of the clump 102 of the mowed lawn, the processing unit 11 specifies that a failure has occurred and contents of the failure indicate the clump 102 of the mowed lawn, and executes corresponding control. In this embodiment, as control corresponding to the clump 102 of the mowed lawn, the clump is eliminated to be flattened. To do this, the processing unit 11 specifies the position of the clump 102 of the mowed lawn, and changes the course of the work machine 1 to pass through the clump 102 of the mowed lawn, as indicated by a state ST4. Furthermore, the work time is increased. The work time can be increased by, for example, decelerating the moving speed of the work machine 1 or increasing the number of times the position of the clump 102 of the mowed lawn is passed through. In the above-described schedule control, the work plan is modified. This control can eliminate the clump 102 of the mowed lawn, thereby improving the outer appearance of the work area WA.

Note that when passing through the clump 102 of the mowed lawn, the work unit 5 (the rotation of the rotary cutter 5a) may be stopped. By only passing through the clump 102 of the mowed lawn, the clump 102 can be stepped on firmly to be flattened or scattered around to be eliminated, and it is possible to avoid a situation in which the rotary cutter 5a is locked by rolling in the clump 102 of the mowed lawn.

For example, the position of the clump 102 of the mowed lawn may be specified as a position forward from the current position of the work machine 1 by a predetermined distance in the azimuth of the actual position of the clump 102 of the mowed lawn with respect to the work machine 1, which is specified from the position of the image of the clump 102 of the mowed lawn in the image. The image recognition unit 14 may calculate the distance to the work machine 1 from the image of the clump 102 of the mowed lawn. If this calculation operation is adopted, it is also possible to more correctly estimate the position of the clump 102 of the mowed lawn with respect to the work machine 1 by providing two image capturing devices 9 apart from each other in the vehicle width direction, and using the parallax between two captured images. Alternatively, the distance of the marker 101 with respect to the work machine 1 may be measured by providing a distance measurement sensor in the work machine 1, and the position of the marker 101 may be specified. As for such method of specifying the position of the clump 102 of the mowed lawn, the same applies to specifying of the position of the occurrence of another failure (to be described later).

Figure 8:
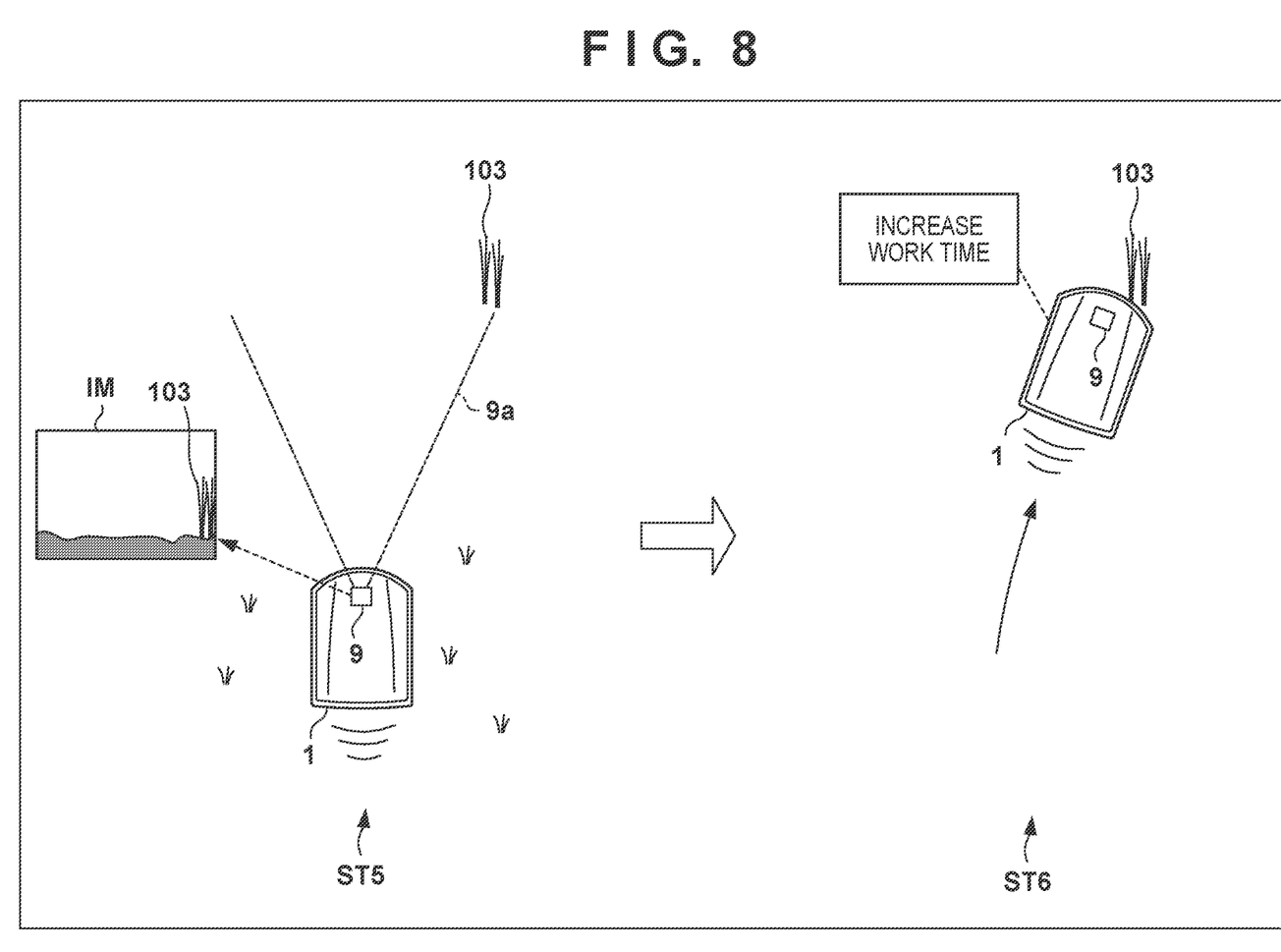
FIG. 8 is an explanatory view showing still another example of control of the autonomous work machine shown in FIG. 1.

FIG. 8 shows an example of control when the existence of another failure is recognized. A state ST5 indicates a state in which conspicuous weeds 103 fall within the image capturing range 9a and an image of the weeds 103 is included in the captured image IM. The image recognition unit 14 recognizes the existence of the weeds 103 from the captured image IM.

When the image recognition unit 14 recognizes the existence of the weeds 103, the processing unit 11 specifies that a failure has occurred and contents of the failure indicate the weeds 103, and executes corresponding control. In this embodiment, as control corresponding to the weeds 103, the weeds 103 are mowed. To do this, the processing unit 11 specifies the position of the weeds 103, and changes the course of the work machine 1 to pass through the weeds 103, as indicated by a state ST6. Furthermore, the work time is increased. The work time can be increased by, for example, decelerating the moving speed of the work machine 1 or increasing the number of times the position of the weeds 103 of the mowed lawn is passed through, similar to the example shown in FIG. 7. In the above-described schedule control, the work plan is modified. This control can mow the weeds 103, thereby improving the outer appearance of the work area WA.

Note that similar to the case of the clump 102 of the mowed lawn, when passing through the weeds 103, the work unit 5 (the rotation of the rotary cutter 5a) may be stopped. By only passing through the weeds 103, the weeds 103 can be stepped on firmly to be flattened or scattered around to eliminate the weeds 103, and it is possible to avoid a situation in which the rotary cutter 5a is locked by rolling in the weeds 103.

Figure 9:
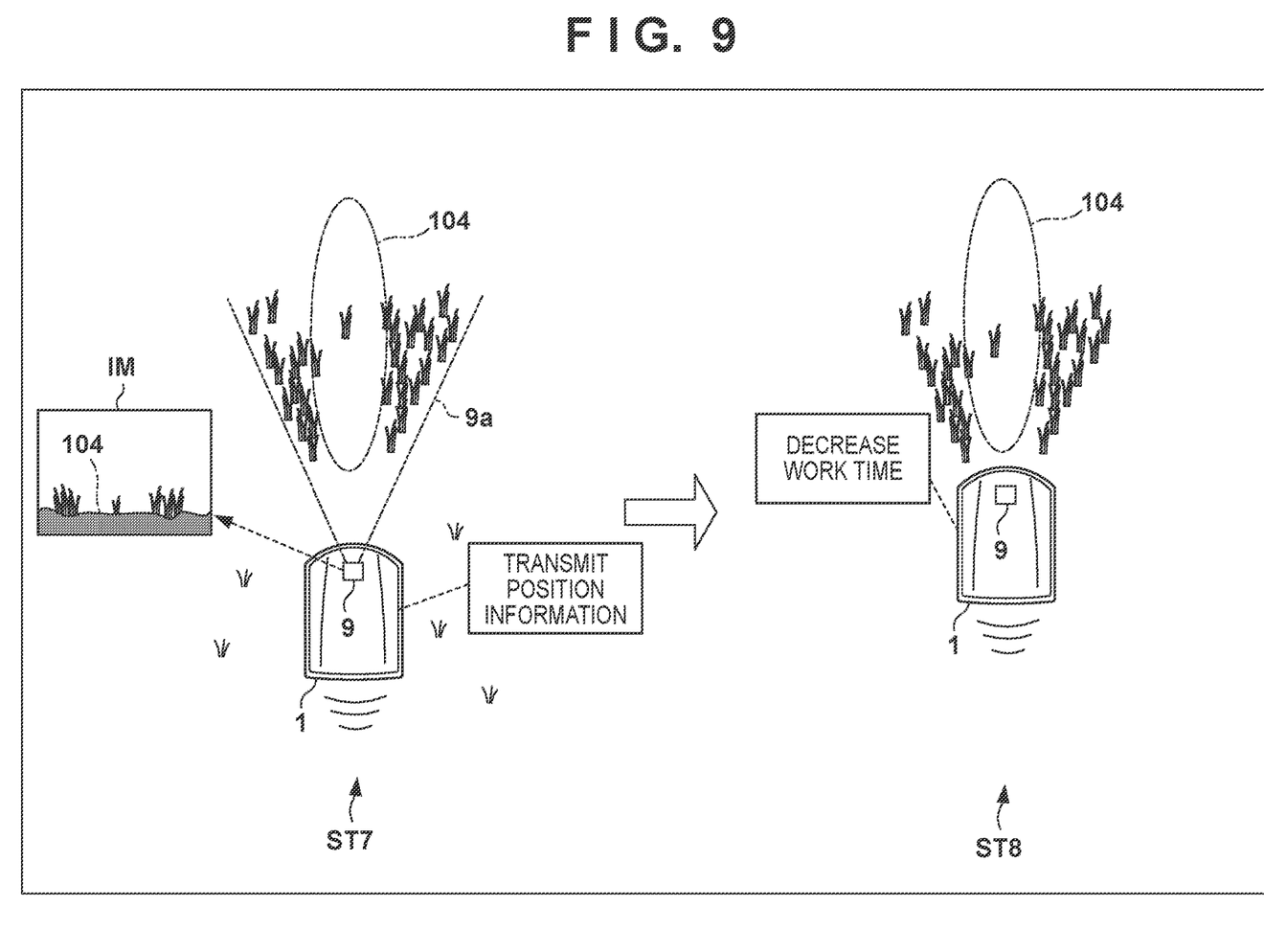
FIG. 9 is an explanatory view showing still another example of control of the autonomous work machine shown in FIG. 1.

FIG. 9 shows an example of control when the existence of still another failure is recognized. A state ST7 indicates a state in which the peeling-off 104 of the lawn falls within the image capturing range 9a and an image of the peeling-off 104 of the lawn is included in the captured image IM. The image recognition unit 14 recognizes the existence of the peeling-off 104 of the lawn from the captured image IM.

When the image recognition unit 14 recognizes the existence of the peeling-off 104 of the lawn, the processing unit 11 specifies that a failure has occurred and contents of the failure indicate the peeling-off 104 of the lawn, and executes corresponding control. In this embodiment, as control corresponding to the peeling-off 104 of the lawn, the growth of the lawn is promoted by decreasing the work time at a location where the lawn is peeled off or avoiding the location.

In an example in a state ST8, the processing unit 11 passes through the location of the peeling-off 104 of the lawn but decreases the work time. The work time can be decreased by, for example, accelerating the moving speed of the work machine 1 or decreasing the number of times the position of the peeling-off 104 of the lawn is passed through. In the above-described schedule control, the work plan is modified. This control can avoid further worsening of the growth of the lawn at the location where the peeling-off 104 of the lawn has occurred, thereby improving the outer appearance of the work area WA.

It is difficult for the work machine 1 to solve the peeling-off 104 of the lawn. Therefore, in the state ST7, while recording the position of the peeling-off 104 of the lawn, information of the position of the peeling-off 104 of the lawn is transmitted to the management server 201 via the communication unit 17. The information of the position of the peeling-off 104 of the lawn can be transmitted from the management server 201 to the portable terminal 202, and the user of the portable terminal 202 can recognize the position of the peeling-off 104 of the lawn, and perform a necessary recovery operation. Even if the existence of a sick lawn is recognized instead of the peeling-off 104 of the lawn, the same control as that for the peeling-off 104 of the lawn can be performed.

Note that transmission of the information of the position of the failure location may be performed for a failure that can be recovered by the work machine 1, as in the examples shown in FIGS. 7 and 8, or may be performed only for a failure that is difficult to be recovered by the work machine 1, as in the example shown in FIG. 9. In this case, processing may be performed to determine whether contents of the failure can be recovered by the work machine 1, and transmit, if it is determined that the failure cannot be recovered or contents of the failure are predetermined contents, the information of the position of the failure location.

Figure 10:
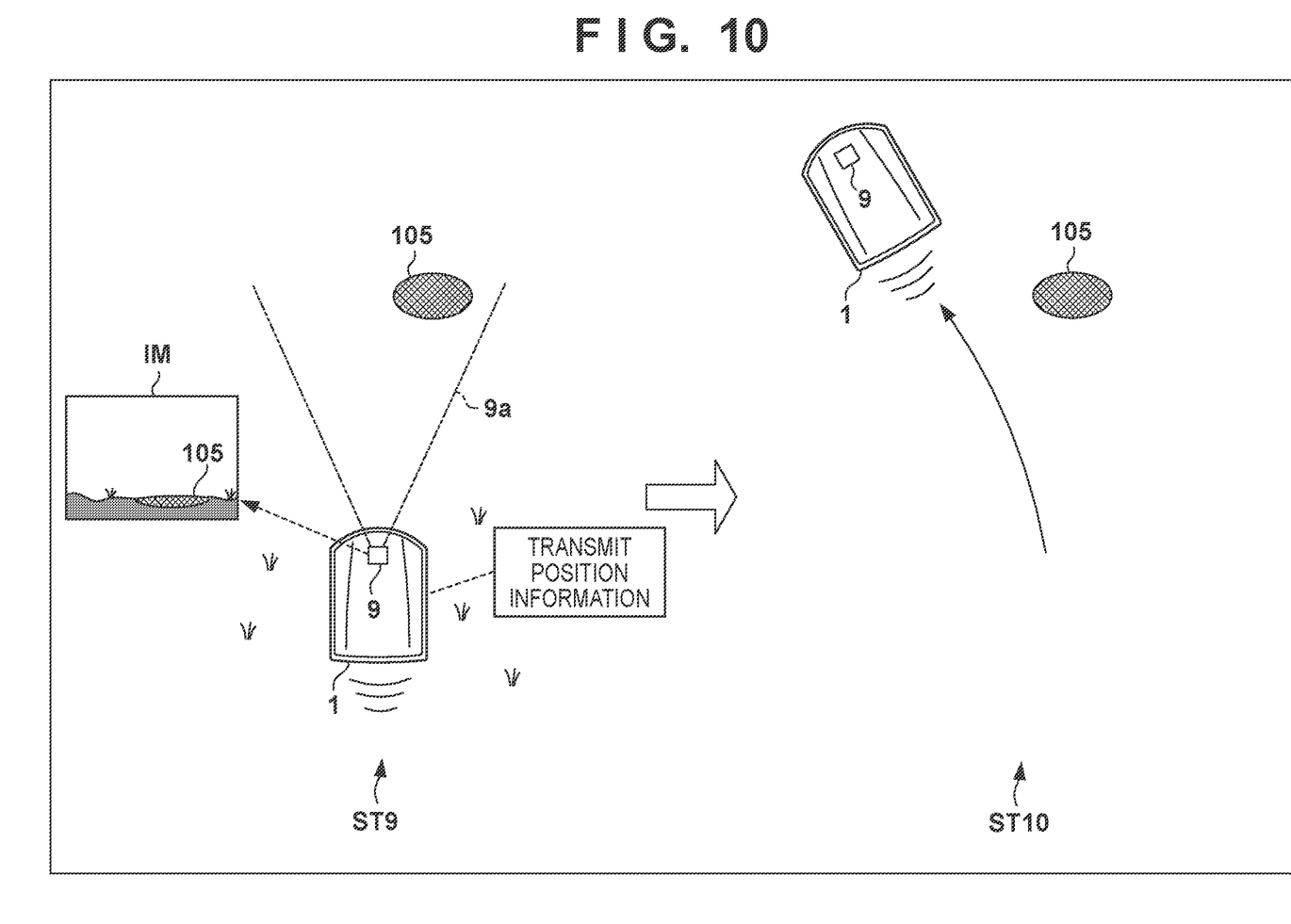
FIG. 10 is an explanatory view showing still another example of control of the autonomous work machine shown in FIG. 1.

FIG. 10 shows an example of control when the existence of still another failure is recognized. A state ST9 indicates a state in which a relatively large hole 105 exists within the image capturing range 9a and an image of the hole 105 is included in the captured image IM. The hole 105 is a hole dug by an animal such as a rabbit or a mole. The image recognition unit 14 recognizes the existence of the hole 105 from the captured image IM.

When the image recognition unit 14 recognizes the existence of the hole 105, the processing unit 11 specifies that a failure has occurred and contents of the failure indicate the hole 105, and executes corresponding control. In this embodiment, as control corresponding to the hole 105, movement control of turning before the hole 105 is performed to avoid a situation in which the work machine 1 gets in the hole 105 to be immovable.

In an example in a state ST10, the processing unit 11 specifies the position of the hole 105, and changes the course so as to turn before the hole 105 and travel around the hole 105. The course of the work machine 1 after turning may turn left or right or return in the opposite direction of the traveling direction, instead of traveling around the hole 105. This control can avoid an object that hinders the movement or work of the work machine 1, thereby preventing interruption of the work. When avoiding the object, in the above-described schedule control, the work plan is modified. However, when control of traveling around the object and returning to the scheduled route is performed, the work plan may be less modified.

It is difficult for the work machine 1 to fill the hole 105. Therefore, in the state ST9, while recording the position of the hole 105, information of the position of the hole 105 is transmitted to the management server 201 via the communication unit 17. The information of the position of the hole 105 can be transmitted from the management server 201 to the portable terminal 202, and the user of the portable terminal 202 can recognize the position of the hole 105, and perform a necessary work of filling the hole. Even if the existence of the track 106 is recognized instead of the hole 105, the same control as that for the hole 105 can be performed.

Figure 11:
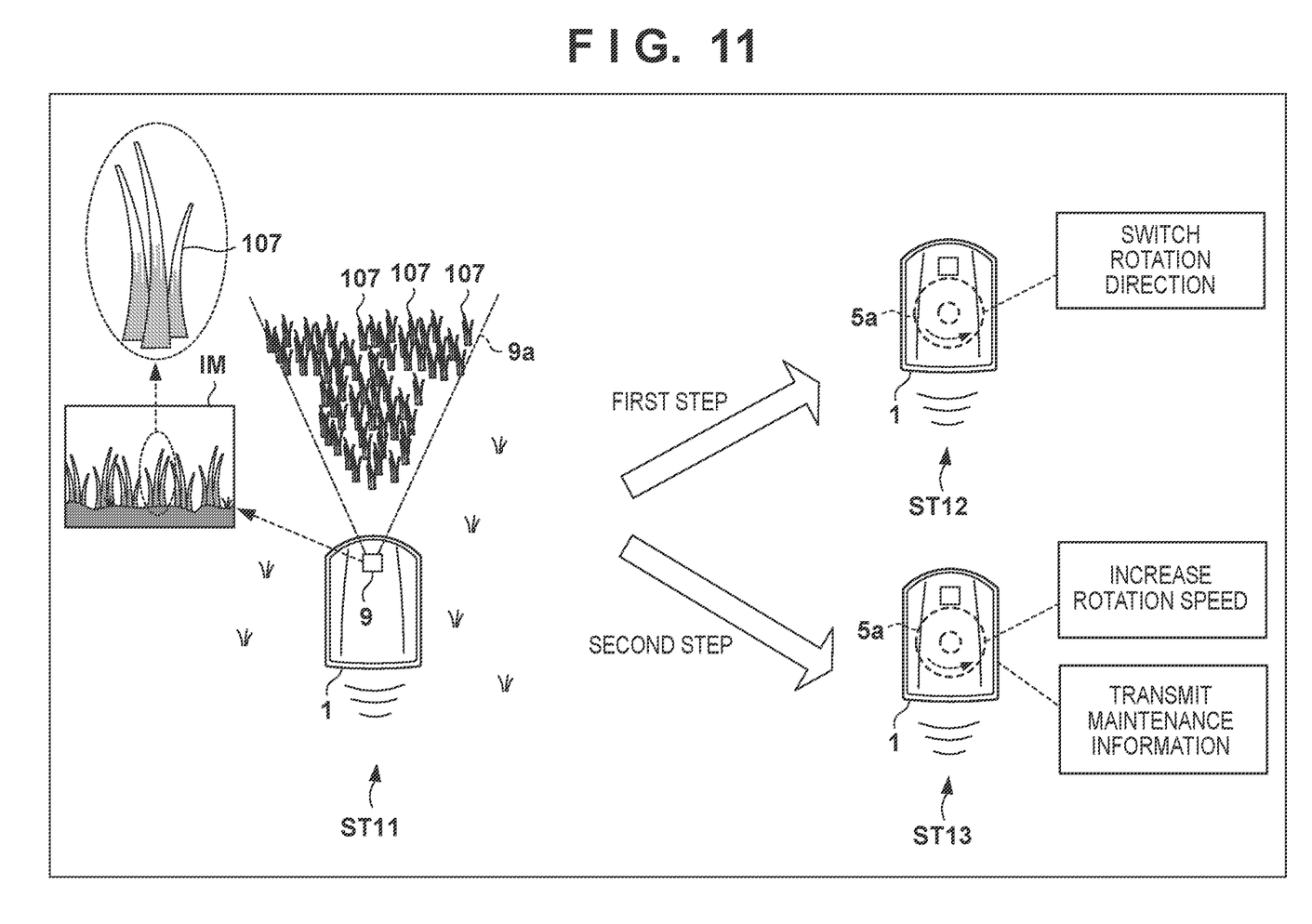
FIG. 11 is an explanatory view showing still another example of control of the autonomous work machine shown in FIG. 1.

FIG. 11 shows an example of control when the existence of still another failure is recognized. A state ST11 indicates an example in which many lawn leaves 107 having whitened tips are mixed within the image capturing range 9a and an image of the lawn leaves 107 is included in the captured image IM. The lawn leaves 107 having whitened tips indicate that a cutting condition is bad at the time of past lawn mowing, which means deterioration (wear) in cutting ability of the rotary cutter 5a. If the lawn leaves 107 having whitened tips are mixed, the outer appearance of the work area WA deteriorates.

When the image recognition unit 14 recognizes the existence of the lawn leaves 107, the processing unit 11 specifies that a failure has occurred and contents of the failure indicate the lawn leaves 107 (in other words, deterioration in cutting ability of the rotary cutter 5a), and executes corresponding control. In this embodiment, as control corresponding to the lawn leaves 107, control of improving the cutting ability of the rotary cutter 5a is performed. This can improve the deterioration of the outer appearance of the work area WA.

As control of improving the cutting ability of the rotary cutter 5a, in this embodiment, the rotation direction is switched (reversed) or the rotation speed of the rotary cutter 5a rotated at a constant speed is increased. By switching the rotation direction, the lawn can be mowed using a portion of a blade which has not been used for lawn mowing, thereby improving the cutting ability. By increasing the rotation speed, the number of times the blade and the lawn contact each other increases, thereby improving the cutting ability.

Only one of the two improving control operations may be executed or both of them may be executed at the same time. In this embodiment, however, these two operations are executed stepwise. As indicated by a state ST12, the rotation direction is switched to perform a lawn mowing work. After that, if the lawn leaves 107 having whitened tips are detected again, the rotation speed is increased, as indicated by a state ST13. Since the increase in rotation speed increases the power consumption of the motor 5c, it is possible to maintain the lawn mowing performance while suppressing the increase in power consumption by preferentially switching the rotation direction stepwise.

In the step of the state ST13, it can be said that the rotary cutter 5a needs to be replaced. Therefore, in the state ST13, maintenance information for making a notification of the life of the rotary cutter 5a is transmitted to the management server 201 via the communication unit 17. The maintenance information can be transmitted from the management server 201 to the portable terminal 202, and the user of the portable terminal 202 can recognize the life of the rotary cutter 5a and perform a work of replacing the rotary cutter 5a.

As described above, the work machine 1 according to this embodiment can specify the existence of a failure and its contents without contacting the target of the failure by specifying the occurrence of the failure and its contents from a captured image of the image capturing device 9, and quickly cope with various events having occurred in the work area. It is possible to optimally cope with the failure by defining, in advance, control of the work machine 1 corresponding to the contents of the failure.

Summary of Embodiment

The above-described embodiment at least discloses the following work machine.

1. A work machine (for example, a work machine 1) according to the above-described embodiment is an autonomous work machine for automatically performing a work on a work area (for example, a work area WA) while moving in the work area, comprising:
    an image capturing unit (for example, an image capturing device 9) configured to capture the work area; and
    a control unit (for example, a control unit 10) configured to specify, based on an image of the work area captured by the image capturing unit, contents of a failure having occurred in the work area, and control the autonomous work machine based on the specified contents of the failure.

According to this embodiment, by specifying the occurrence and contents of the failure from the captured image, it is possible to specify the existence of the failure and its contents without contacting the target of the failure, and quickly cope with various events having occurred in the work area.

2. In the above-described embodiment, the control unit specifies an occurrence position at which the failure has occurred, and controls the autonomous work machine based on the occurrence position and the contents of the failure.

According to this embodiment, it is possible to perform control of travelling around or passing through the occurrence position of the failure.

3. In the above-described embodiment, if the specified contents of the failure are predetermined contents, the control unit controls movement of the autonomous work machine so as to turn before the occurrence position.

According to this embodiment, it is possible to avoid a situation in which the movement or operation of the autonomous work machine is hindered.

4. In the above-described embodiment, if the specified contents of the failure are predetermined contents, the control unit controls movement of the autonomous work machine so as to travel around the occurrence position.

According to this embodiment, it is possible to avoid a situation in which the movement or operation of the autonomous work machine is hindered.

5. The autonomous work machine according to the above-described embodiment further comprises a transmission unit (for example, a communication unit 17) configured to transmit information indicating the occurrence position and the contents of the failure.

According to this embodiment, it is possible to manage the occurrence of the failure in a server or notify the user of it.

6. In the above-described embodiment, the control unit controls a work time of the autonomous work machine at the occurrence position based on the specified contents of the failure.

According to this embodiment, it is possible to solve the failure or prevent extension of the failure.

7. In the above-described embodiment,
    the work on the work area is a lawn mowing work,
        if the specified contents of the failure are first contents, the control unit increases the work time of the autonomous work machine at the occurrence position, and
        the first contents include at least one of existence of a clump of a mowed lawn and existence of weeds.

According to this embodiment, it is possible to eliminate the clump of the mowed lawn and the weeds.

8. In the above-described embodiment,
    the work on the work area is a lawn mowing work, if the specified contents of the failure are second contents, the control unit decreases the work time of the autonomous work machine at the occurrence position, and the second contents include at least one of existence of a sick lawn and existence of peeling-off of a lawn.

According to this embodiment, it is possible to prevent the spread of the sickness of the lawn and the peeling-off of the lawn caused by the work.

9. In the above-described embodiment, the work on the work area is a lawn mowing work, if the specified contents of the failure are first contents, the control unit moves the autonomous work machine to the occurrence position of the failure, and performs the lawn mowing work, and the first contents include at least one of existence of a clump of a mowed lawn and existence of weeds.

According to this embodiment, it is possible to eliminate the clump of the mowed lawn and mow the weeds.

10. In the above-described embodiment, the work on the work area is a lawn mowing work by a rotary cutter, and if the specified contents of the failure indicate whitened tips of lawn leaves, the control unit performs the lawn mowing work by reversely rotating the rotary cutter.

According to this embodiment, it is possible to mow the lawn leaves having whitened tips while maintaining the cutting ability of the rotary cutter.

11. In the above-described embodiment, the work on the work area is a lawn mowing work by a rotary cutter, and if the specified contents of the failure indicate whitened tips of lawn leaves, the control unit performs the lawn mowing work by increasing a rotation speed of the rotary cutter.

According to this embodiment, it is possible to mow the lawn leaves having whitened tips while maintaining the cutting ability of the rotary cutter.

12. In the above-described embodiment, the work on the work area is a lawn mowing work by a rotary cutter, if the specified contents of the failure indicate whitened tips of lawn leaves, the control unit performs the lawn mowing work by reversely rotating the rotary cutter, and if the failure of whitened tips of lawn leaves is specified after performing the lawn mowing work by reversely rotating the rotary cutter, the control unit performs the lawn mowing work by increasing a rotation speed of the rotary cutter.

According to this embodiment, it is possible to mow the lawn leaves having whitened tips while maintaining the cutting ability of the rotary cutter.

The present invention is not limited to the above embodiments and various changes and modifications can be made within the spirit and scope of the present invention. Therefore, to apprise the public of the scope of the present invention, the following claims are made.

What is claimed is:

1. An autonomous work machine for automatically performing a work on a work area while moving in the work area, comprising:

an image capturing unit configured to capture the work area;

a control unit configured to specify, based on an image of the work area captured by the image capturing unit, contents of a failure having occurred in the work area, and control the autonomous work machine based on the contents of the failure specified; and a transmission unit configured to transmit information indicating an occurrence position at which the failure has occurred and the contents of the failure specified.

2. The autonomous work machine according to claim 1, wherein the control unit controls the autonomous work machine based on the occurrence position and the contents of the failure.

3. The autonomous work machine according to claim 2, wherein if the contents of the failure specified are predetermined contents, the control unit controls movement of the autonomous work machine so as to turn before the occurrence position.

4. The autonomous work machine according to claim 2, wherein if the contents of the failure specified are predetermined contents, the control unit controls movement of the autonomous work machine so as to travel around the occurrence position.

5. The autonomous work machine according to claim 2, wherein the control unit controls a work time of the autonomous work machine at the occurrence position based on the contents of the failure specified.

6. The autonomous work machine according to claim 5, wherein the work on the work area is a lawn mowing work, if the contents of the failure specified are first contents, the control unit increases the work time of the autonomous work machine at the occurrence position, and the first contents include existence of a clump of a mowed lawn and/or existence of weeds.

7. The autonomous work machine according to claim 5, wherein the work on the work area is a lawn mowing work, if the contents of the failure specified are second contents, the control unit decreases the work time of the autonomous work machine at the occurrence position, and the second contents include existence of a sick lawn and/or existence of peeling-off of a lawn.

8. The autonomous work machine according to claim 1, wherein the work on the work area is a lawn mowing work, if the contents of the failure specified are first contents, the control unit moves the autonomous work machine to the occurrence position of the failure, and performs the lawn mowing work, and the first contents include existence of a clump of a mowed lawn and/or existence of weeds.

9. The autonomous work machine according to claim 1, wherein the work on the work area is a lawn mowing work by a rotary cutter, and if the contents of the failure specified indicate whitened tips of lawn leaves, the control unit performs the lawn mowing work by reversely rotating the rotary cutter.

10. The autonomous work machine according to claim 1, wherein the work on the work area is a lawn mowing work by a rotary cutter, and if the contents of the failure specified indicate whitened tips of lawn leaves, the control unit performs the lawn mowing work by increasing a rotation speed of the rotary cutter.

11. The autonomous work machine according to claim 1, wherein the work on the work area is a lawn mowing work by a rotary cutter, if the contents of the failure specified indicate whitened tips of lawn leaves, the control unit performs the lawn mowing work by reversely rotating the rotary cutter, and if the failure of whitened tips of lawn leaves is specified after performing the lawn mowing work by reversely rotating the rotary cutter, the control unit performs the lawn mowing work by increasing a rotation speed of the rotary cutter.

12. The autonomous work machine according to claim 1, wherein the transmission unit transmits the information when the failure can be recovered by the autonomous work machine.

13. The autonomous work machine according to claim 1, wherein the transmission unit transmits the information when the failure cannot be recovered by the autonomous work machine.

14. The autonomous work machine according to claim 1, wherein the transmission unit transmits the information when the contents of the failure are predetermined contents.

15. A method of controlling an autonomous work machine for automatically performing a work on a work area while moving in the work area, the method comprising:

obtaining an image of the work area by capturing the work area;

specifying, based on the image of the work area, contents of a failure having occurred in the work area, controlling the autonomous work machine based on the contents of the failure specified, and transmitting information indicating an occurrence position at which the failure has occurred and the contents of the failure specified.

16. A non-transitory computer-readable storage medium storing a program configured to cause a computer to execute a method of controlling an autonomous work machine for automatically performing a work on a work area while moving in the work area, the method comprising:

obtaining an image of the work area by capturing the work area;

specifying, based on the image of the work area, contents of a failure having occurred in the work area, controlling the autonomous work machine based on the contents of the failure specified, and transmitting information indicating an occurrence position at which the failure has occurred and the contents of the failure specified.

\* \* \* \* \*